United States Patent
Grivas et al.

(10) Patent No.: US 8,033,511 B2
(45) Date of Patent: Oct. 11, 2011

(54) PIPE SUPPORT ASSEMBLY

(76) Inventors: Demetrios Grivas, Toronto (CA);
Arnold Choi, Houston, TX (US)

( * ) Notice: Subject to any disclaimer, the term of this patent is extended or adjusted under 35 U.S.C. 154(b) by 377 days.

(21) Appl. No.: 12/181,788

(22) Filed: Jul. 29, 2008

(65) Prior Publication Data
US 2010/0025548 A1    Feb. 4, 2010

(51) Int. Cl.
*E21F 17/02* (2006.01)
(52) U.S. Cl. .................................. 248/58; 248/62
(58) Field of Classification Search .................. 248/58,
248/62, 219.4, 219.3, 230.1; 138/106, 107,
138/116; 24/570, 545, 20 R, 22, 129 R, 20 CW;
285/61, 24, 64; 211/113, 118, 75
See application file for complete search history.

(56) References Cited

U.S. PATENT DOCUMENTS

| | | | |
|---|---|---|---|
| 4,146,203 A | 3/1979 | Williams | |
| 5,192,039 A * | 3/1993 | Williams | 248/62 |
| 6,126,119 A | 10/2000 | Giangrasso | |
| 6,224,025 B1 | 5/2001 | Alvarez | |
| 6,330,989 B1 * | 12/2001 | Okamoto | 248/74.1 |
| 6,390,421 B1 * | 5/2002 | Rudd | 248/68.1 |
| 6,505,796 B1 * | 1/2003 | Roth | 248/62 |
| 6,691,742 B1 | 2/2004 | Cooper | |
| 6,843,456 B1 * | 1/2005 | Hajianpour | 248/230.1 |
| 7,677,505 B2 * | 3/2010 | Deichman | 248/58 |
| 2006/0138286 A1 | 6/2006 | Connolly | |

* cited by examiner

*Primary Examiner* — Alfred Joseph Wujciak, III

(57) ABSTRACT

A pipe support assembly for supporting one or more pipes. According to an embodiment, the pipe support assembly comprises a main member having a saddle for holding a first pipe, a pipe holder attached to the main member and configured for holding a second pipe, and the main member includes an exterior surface for receiving a support strap for affixing to the structure. According to an embodiment, the first pipe comprises an insulated pipe with an outer insulation layer and the second pipe comprises an uninsulated pipe. According to another embodiment, the pipe support assembly includes a bottom mount for mounting the pipe support assembly to a structure. According to an embodiment, the mount comprises a bracket. According to another aspect, the mount comprises a base that is fastened to a structure.

7 Claims, 9 Drawing Sheets

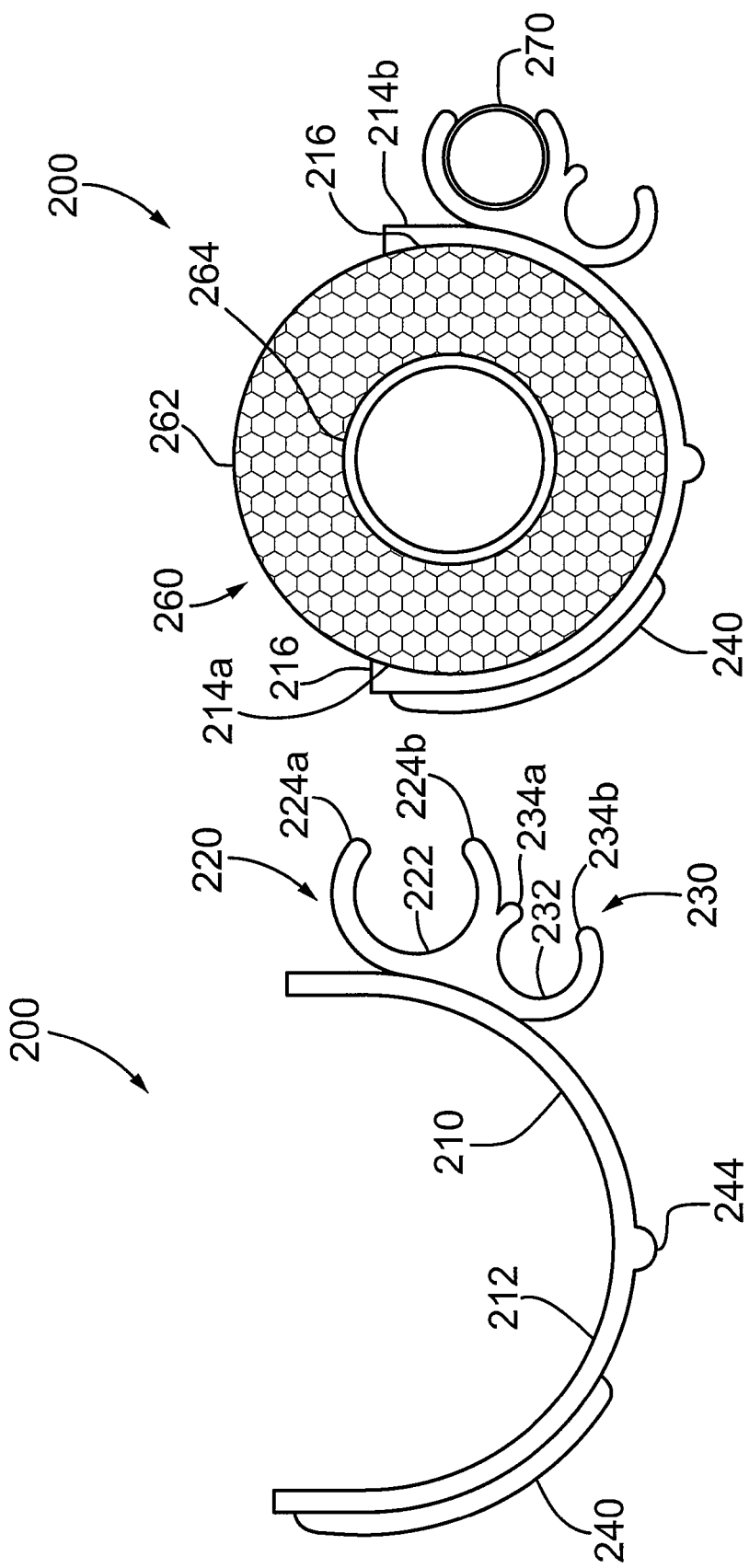

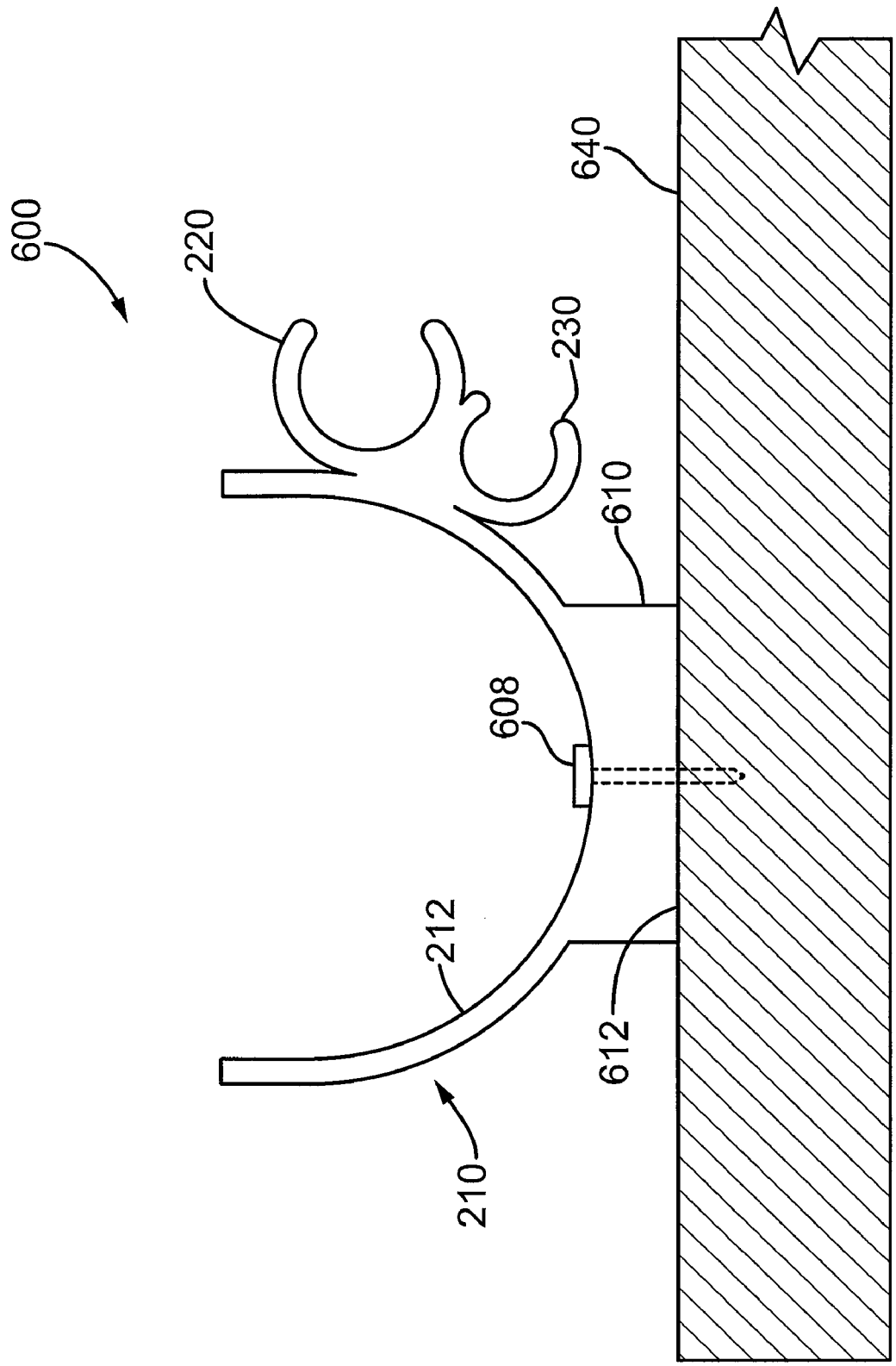

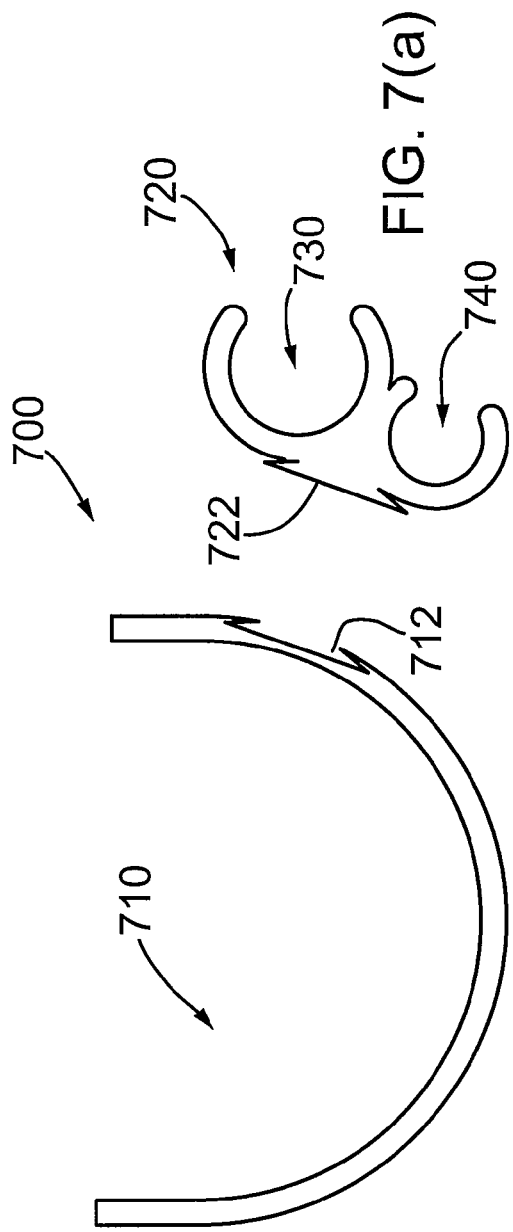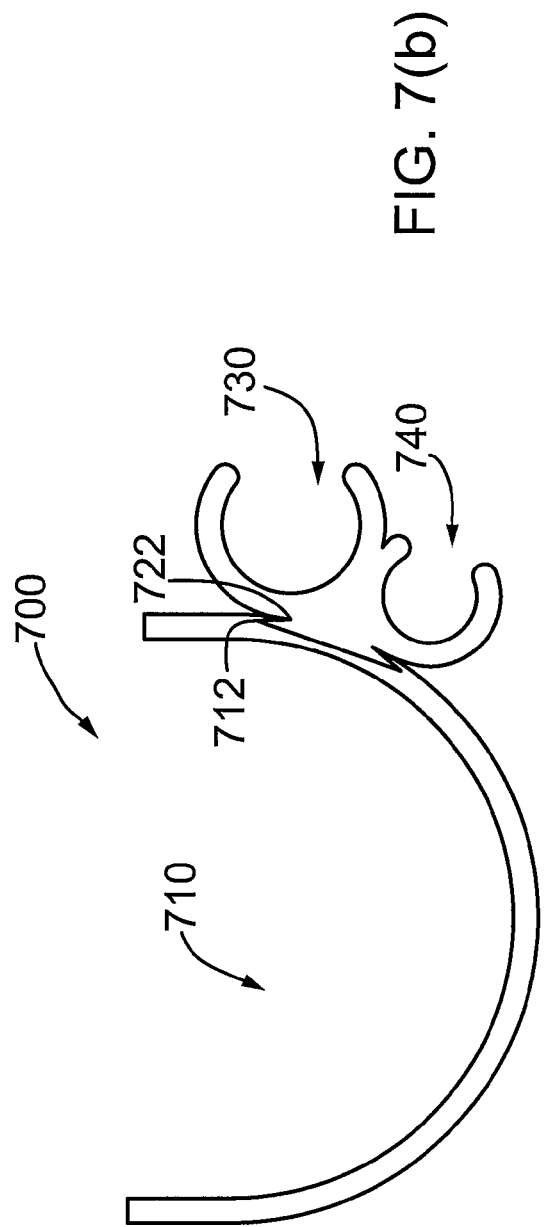

PIPE SUPPORT ASSEMBLY

FIELD OF THE INVENTION

The present invention relates to heating, ventilation, air conditioning and refrigeration (HVAC/R) systems, and more particularly, to an assembly for supporting pipes and tubes used in HVAC/R systems.

BACKGROUND OF THE INVENTION

HVAC/R systems are now commonly found in residential and commercial buildings throughout the world. A typical refrigeration or air conditioning system includes a condenser, a compressor, an evaporator and an expansion device that are connected together with piping. Generally, the piping consists of an insulated suction line and an uninsulated liquid line. A refrigerant flows through both lines. Several methods for installing and supporting the piping are known in the art.

A common technique for supporting the piping is to tape the uninsulated line to the uninsulated liquid line in several places using tape. To support the lines, a metal strap is fixed under the taped lines and is secured to a horizontal surface such as a ceiling or a floor joist. This technique has several limitations. First, when the lines are taped together, the insulation of the insulated line can be crushed which reduces its insulating properties. Second, the metal strap which supports the line combination makes contact with and corrodes the liquid line. Finally, the installation technique is cumbersome and time-consuming as technicians must tape the lines together and hoist them to the ceiling while fixing the support straps to the ceiling.

Plastic supports for supporting piping are also known in the art. A commonly used support consists of a saddle for supporting a single insulated pipe. This type of support lacks the ability to support the liquid line resulting in a technician having to use electrical tape as described above.

Accordingly, there remains a need for improvements in the art.

BRIEF SUMMARY OF THE INVENTION

According to one aspect, the present invention comprises a pipe support assembly for supporting one or more pipes from a structure, the pipe support assembly comprising, a main member having a saddle for holding a first pipe; a pipe holder attached to the main member and configured for holding a second pipe; the main member including an exterior surface for receiving a support strap for affixing to the structure.

According to another aspect, the present invention comprises a pipe support assembly for supporting one or more pipes, the pipe support assembly comprising, a main member having a saddle for holding a first pipe; a pipe holder attached to the main member and configured for holding a second pipe; and a mount attached to the main member for securing the pipe support assembly to a structural member.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention and in which:

FIG. 2(a) shows a cross-sectional view of a pipe support assembly according to an embodiment of the present invention;

FIG. 2(b) shows a cross-sectional view of the pipe support assembly of FIG. 2(a) with an insulated pipe and an uninsulated pipe installed in the pipe support assembly;

FIG. 6 shows a cross-sectional view of a pipe support assembly with a mounting base for supporting the pipe support assembly according to an embodiment of the present invention;

FIG. 7(a) shows a cross-sectional view of an unassembled pipe support assembly according to an embodiment of the present invention; and FIG. 7(b) shows a cross-sectional view of an assembled pipe support assembly according to an embodiment of the present invention.

In drawings like reference numerals indicate like elements.

DETAILED DESCRIPTION OF THE EMBODIMENTS

Figure 1:
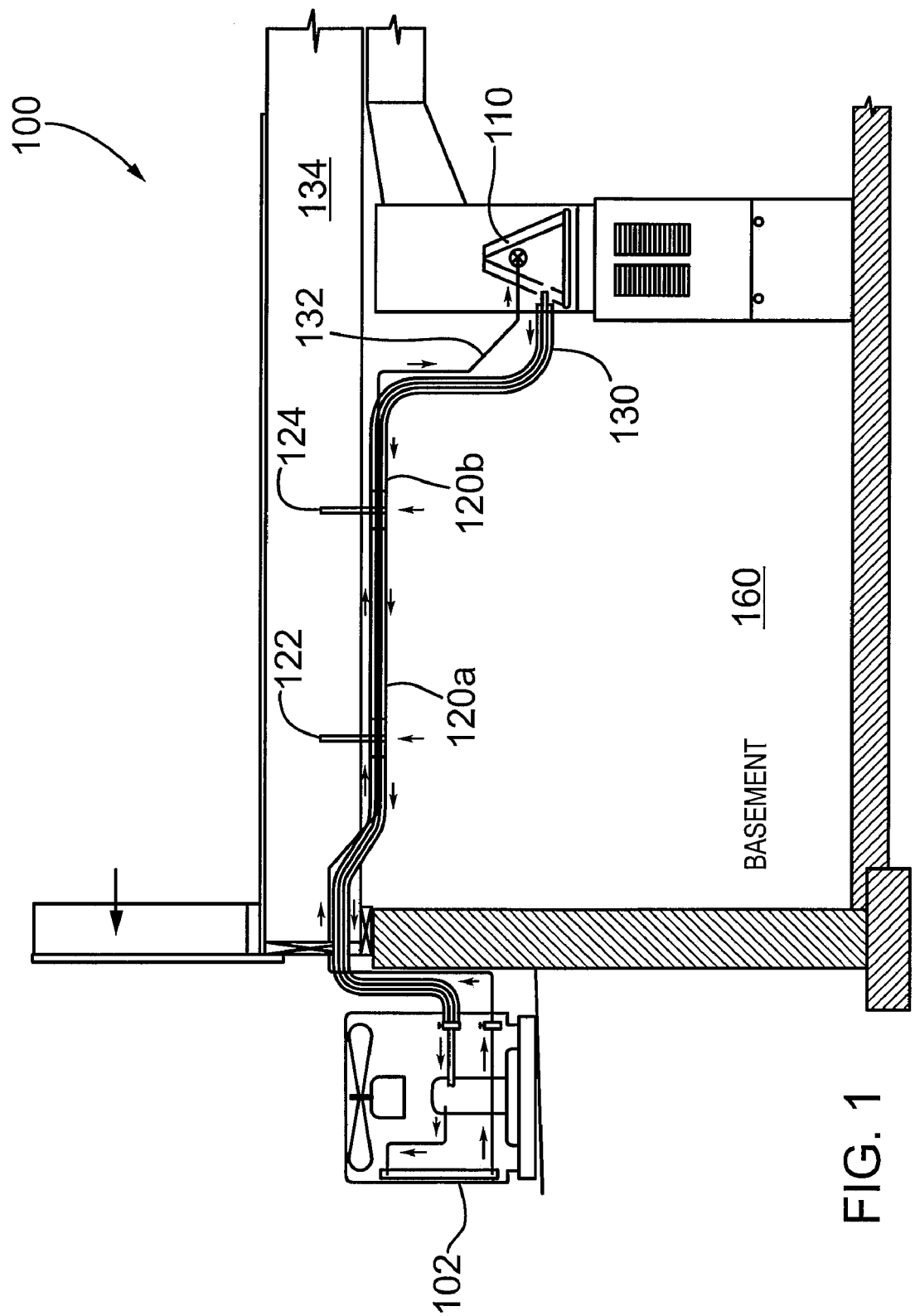
FIG. 1 shows in diagrammatic form an HVAC/R system utilizing a pair of pipe support assemblies according to an embodiment of the present invention.

Reference is first made to FIG. 1 which illustrates in diagrammatic form an exemplary HVAC/R installation utilizing a pair of pipe support assemblies according to the present invention. The HVAC/R installation is indicated generally by reference 100 and a pipe hanging or support assembly according to the present invention is indicated generally by reference 120. The HVAC/R installation 100 depicted in FIG. 1 utilizes two pipe support assemblies 120, indicated individually by references 120a and 120b, respectively.

As shown in FIG. 1, the HVAC/R system 100 comprises a condensing unit 102, an evaporation/expansion unit 110, an insulated pipe 130 and an uninsulated pipe 132. In a typical installation, the evaporation/expansion unit 110 of the HVAC/R system 100 is situated indoors, for example, in a basement 160 of a building, and the condensing unit 102 is located outdoors. The evaporation/expansion unit 110 and the condensing unit 102 are coupled together by an insulated pipe 130 and an uninsulated pipe 132, each of which carry a refrigerant. According to the exemplary installation depicted in FIG. 1, the pipe support assemblies 120a and 120b support the insulated pipe 130 and the uninsulated pipe 132. Each of the pipe support assemblies 120a, 120b is secured or mounted to a structural member or surface 134 (for example, a floor joist or a beam) by respective straps 122 and 124. As will be described in more detail below, the pipe support assembly 120 is configured according to an embodiment to support an insulated pipe and one or more uninsulated pipes.

Reference is next made to FIGS. 2(a) to 2(d), which show a pipe support assembly according to an embodiment of the present invention. The pipe support assembly is indicated generally by reference 200 and corresponds to the pipe support assemblies 120a and 120b of FIG. 1. As shown, the pipe support assembly 200 comprises a main member or first pipe holder 210 and a second pipe holder 220. According to an embodiment, the pipe support assembly 200 includes a third pipe holder indicated by reference 230.

According to an embodiment, the first pipe holder 210 is configured to support or hold an insulated pipe, for example, an insulated pipe as indicated by reference 260 in FIG. 2(b). The first pipe holder 210 comprises an interior surface 212 which supports the pipe 260. According to an embodiment, the interior surface 212 comprises a saddle which is generally "U-shaped" to receive the pipe, i.e. an insulated pipe, and has a curve or profile which substantially corresponds to the radius of the pipe (i.e. the insulated pipe 260 of FIG. 2(b)). In known manner, the insulated pipe 260 comprises an inner pipe or tube 264 which is wrapped or surrounded by an insulation layer 262 (for example, a foam material). The second pipe holder 220 comprises an interior surface 222 which is configured to support a pipe, e.g. an uninsulated pipe having a standard diameter, indicated generally by reference 270 in FIG. 2(b). The interior surface 222 has a curve or profile that substantially corresponds to the radius of the pipe 270. According to an embodiment, the second pipe holder 220 has ends 224 (indicated individually by references 224a and 224b), which extend past the mid-point of the pipe and are configured to clasp or hold the pipe once it is inserted in the pipe holder 220, as will be described in more detail below. Similarly, the third pipe holder 230 comprises an interior surface 232 which is configured to support a pipe, for example, having the same, a larger, or a smaller diameter than the pipe for the second holder 220. The interior surface 232 has a curve or profile that substantially corresponds to the radius of the pipe. According to an embodiment, the third pipe holder 230 includes ends 234 (indicated individually by references 234a and 234b), which extend past the mid-point of the pipe and are configured to clasp or hold the pipe once it is inserted in the pipe holder 230, as will be described in more detail below.

Figure 2D:
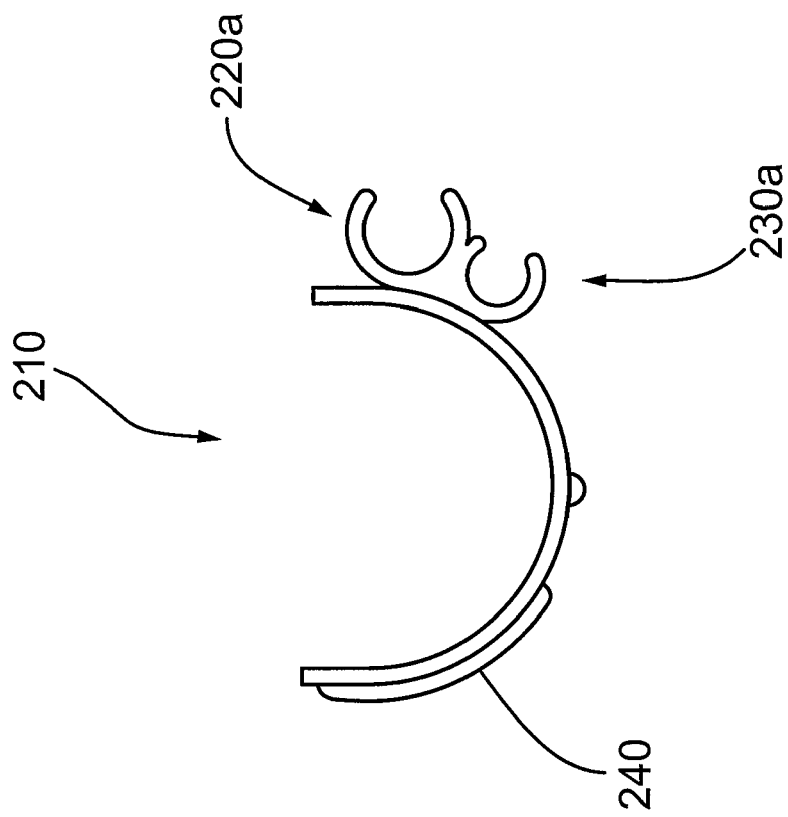
FIG. 2(d) shows an end view of the pipe support assembly of FIG. 2(a)
Figure 2C:
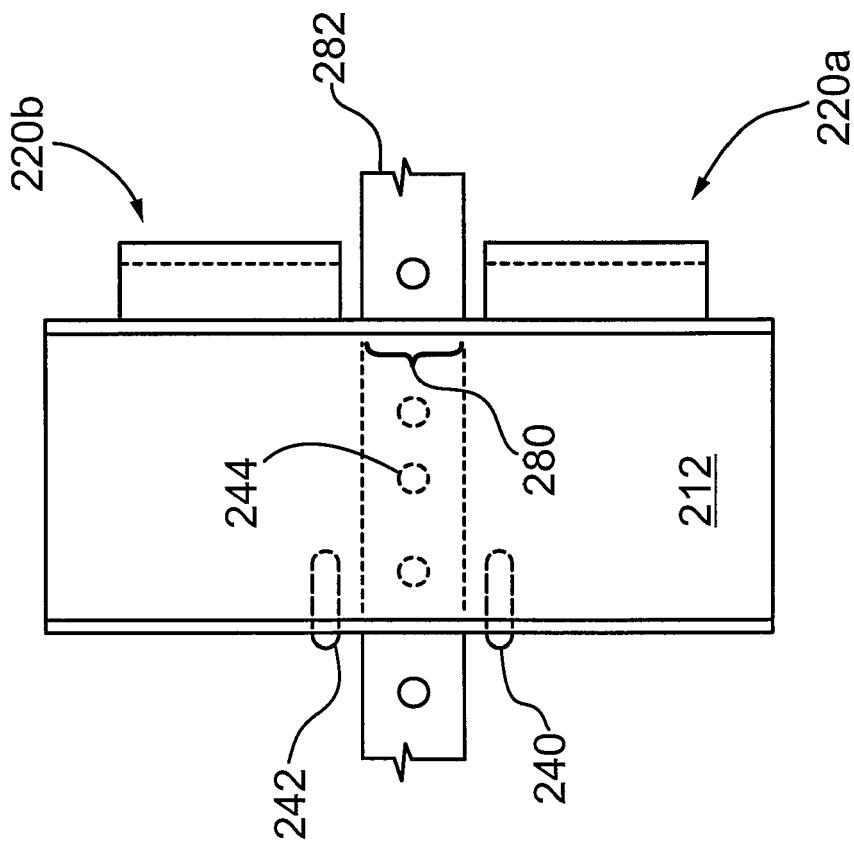
FIG. 2(c) shows a top view of the pipe support assembly of FIG. 2(a)

As shown in FIG. 2(a), the pipe support assembly 200 includes a first rib or guide 240, a second rib or guide 242 (shown in FIG. 2(c)), and a dimple 244. According to an embodiment, the ribs 240, 242 and the dimple 244 are configured to position a perforated strap (e.g. the perforated straps 122 and 124 illustrated in FIG. 1). The dimple 244 comprises a projection which is dimensioned to fit into any one of the perforations (i.e. holes) in the straps 122, 124 (FIG. 1) and serves to anchor the straps 122, 124. The ribs 240, 242 are configured adjacent the dimple 244 and function to prevent the straps 122, 124 (or another hanging device such as a wire) from moving or sliding laterally along the exterior surface of the pipe support assembly 200.

According to this embodiment, the interior surface 212 of the first pipe holder or saddle 210 is dimensioned or configured so as not to crush or unnecessarily compress the insulation layer of the pipe 260. In order to provide additional "grip", the first pipe holder 210 includes ends 214 (indicated individually by references 214a and 214b), which are configured to contact and "grip" the insulation layer 262 for the pipe 260. According to an embodiment, the ends 214 are formed with a flange portion indicated by reference 216, which grips or secures the insulation layer 262 surrounding the pipe 260.

Reference is next made to FIGS. 2(c) and 2(d), which show a top view and an end view respectively of the pipe support assembly 200. According to an embodiment of the present invention, the pipe support assembly 200 includes a pair of second pipe holders 220, indicated individually as 220a and 220b. The pipe support assembly 200 includes a pair of third pipe holders 230, with one being shown and indicated by reference 230a in FIG. 2(d). The pipe holders 220a (and 230a) are separated from the pipe holders 220b (and 230b) by a gap or distance indicated by reference 280. The gap 280 is provided to accommodate a perforated strap 282 as depicted in FIG. 2(c). According to another aspect, the edges of the pipe holders 220a, 220b adjacent the gap 280 serve to confine the perforated strap 282 and block the strap 282 from sliding sideways.

According to an embodiment, the pipe support assembly 200 is fabricated or made from a semi-flexible material, for example, a plastic composition. According to an embodiment, the pipe support assembly 200 is manufactured utilizing an injection molding process, and the first and second (and third or more) pipe holders are formed as an integral or unitary device. A flexible or semi-flexible material is utilized to allow the pipe holders, e.g. the ends 214 of the first pipe holder 210, the ends 224 of the second pipe holder 220 and/or the ends 234 of the third pipe holder 230 to give when a pipe is inserted and then flex or snap back to clasp or hold the inserted pipe.

As described above with reference to FIG. 1, an HVAC/R system generally includes two pipes: an insulated pipe and an uninsulated pipe. In a typical installation, a technician places or mounts an insulated pipe in the first pipe holder or saddle 210 (FIG. 2(a)), and the insulated pipe is supported. According to an embodiment, the pipe support assembly 200 includes flanges 216 (FIG. 2(b)) which are configured to contact with and "grip" the insulation of the insulated pipe. As shown in FIG. 2(b), the insulated pipe 260 has been mounted in the first pipe holder 210 and secured by the flanges 216 on the respective ends 214. The second pipe holder 220 and the third pipe holder 230 are typically configured to accommodate pipes having different diameter(s), for example, an uninsulated pipe for an HVAC/R installation. In operation, a technician utilizes the second pipe holder 220 to secure or mount an uninsulated pipe having a diameter corresponding to the holder 220. As shown in FIG. 2(b), a pipe, for example, the uninsulated pipe 270, has been mounted against the interior surface 222 of the second pipe holder 220, and the ends 224 further hold or secure the pipe 270. The technician utilizes the third pipe holder 230 to secure or mount another pipe, for example, an uninsulated pipe having a smaller diameter.

According to an embodiment, the pipe holders 220, 230 (and the pipe support assembly 200) are formed or made from a flexible material such as injection molded plastic. To secure or mount a pipe, the technician presses the pipe into the second pipe holder 220. As the pipe is inserted into the holder 220, the ends 224 deflect or bend outwards as the pipe is inserted, and then return to their original position once the pipe is fully inserted or seated in the holder 220. The ends 224 partially extend around the outside of the pipe 270, for example, as shown in FIG. 2(b). If a third pipe is required for the installation, the technician repeats this procedure for the third pipe holder 230.

While an embodiment of the pipe support assembly 200 is described with the capacity to hold or carry three pipes, it will be appreciated that the configuration of the pipe support assembly 200 may be modified to hold less than or more than three pipes, having the same or different diameters. According to another aspect, it will be appreciated that the second pipe holder 220 and/or the third pipe holder 230 may be configured or attached to the bottom or a lower section of the pipe support assembly 200, and the present invention is not limited to a side configuration as depicted in FIG. 2(a).

Figure 3:
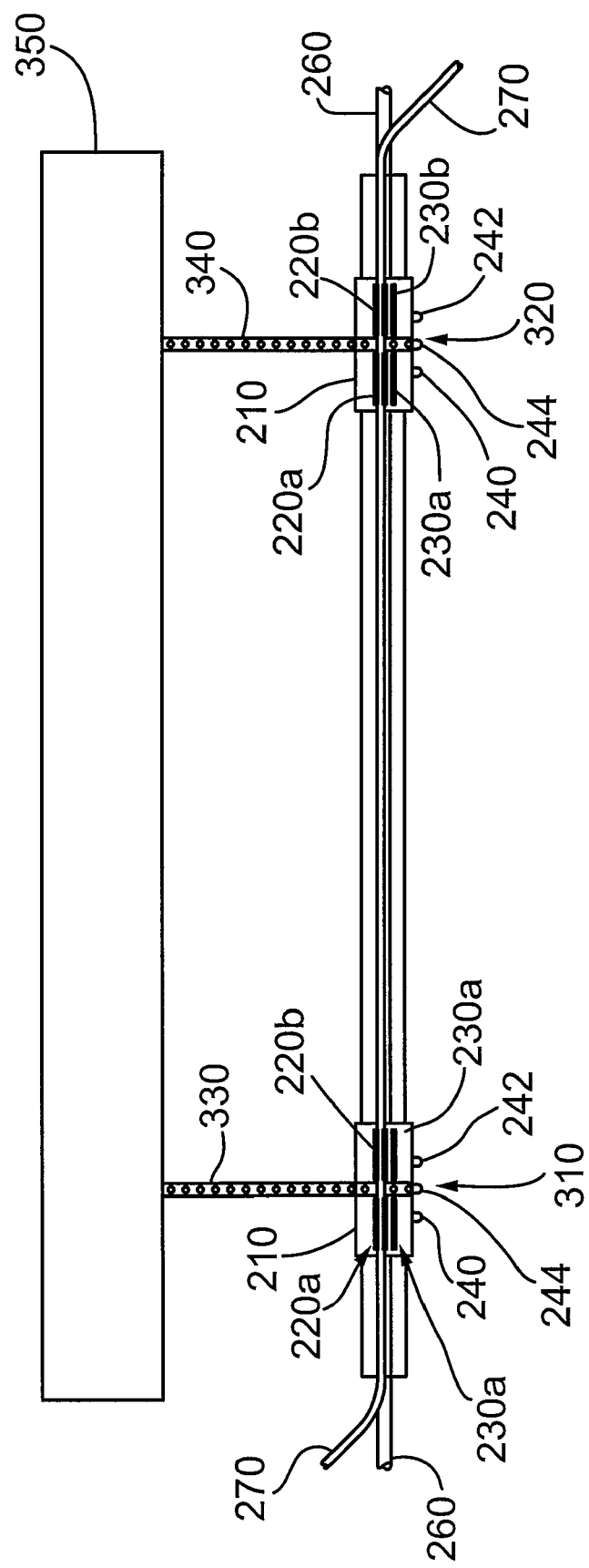
FIG. 3 shows a side view of exemplary HVAC/R piping being supported by a pair of pipe support assemblies according to an embodiment of the present invention.

Reference is made to FIG. 3, which shows in diagrammatic form a typical HVAC/R installation utilizing a pair of pipe support assemblies according to an embodiment of the present invention. The first pipe support assembly is indicated by reference 310 and the second pipe support assembly is indicated by reference 320. The pipe support assemblies 310 and 320 correspond to the pipe support assembly 200 described above with reference to FIGS. 2(a) to 2(d), and comprise a first pipe holder or saddle 210, second and third pipe holders 220 and 230, ribs 240 and 242, and a dimple 244. As shown, the insulated pipe 260 is mounted in the first pipe holder 210 on the respective pipe support assemblies 310 and 320, for example, in a manner as described above. The other pipe (i.e. the uninsulated pipe) 270 is secured or mounted in the second pipe holder 220, for example, pressed or snapped into the holder 220 in a manner as described above. As shown in FIG. 3, each of the pipe support assemblies 310 and 320 is supported or suspended by perforated straps 330 and 340 respectively. In this exemplary installation, each of the perforated straps 330, 340 is attached to a horizontal surface indicated generally by reference 350. The horizontal surface 350 may comprise a floor joist, beam, or other structural element, and the perforated straps 330, 340 are secured using known fasteners, for example, a screw, a nut and bolt, or a nail. As shown, the perforated strap 330 supports the first pipe support assembly 310 and a hole in the strap 330 fits over the dimple 244, and is positioned between the ribs 240, 242. Similarly, the perforated strap 340 supports the second pipe support assembly 320, i.e. with a hole in the strap 340 fitting over the dimple 244, and the strap 340 being positioned between the ribs 240, 242.

Figure 4A:
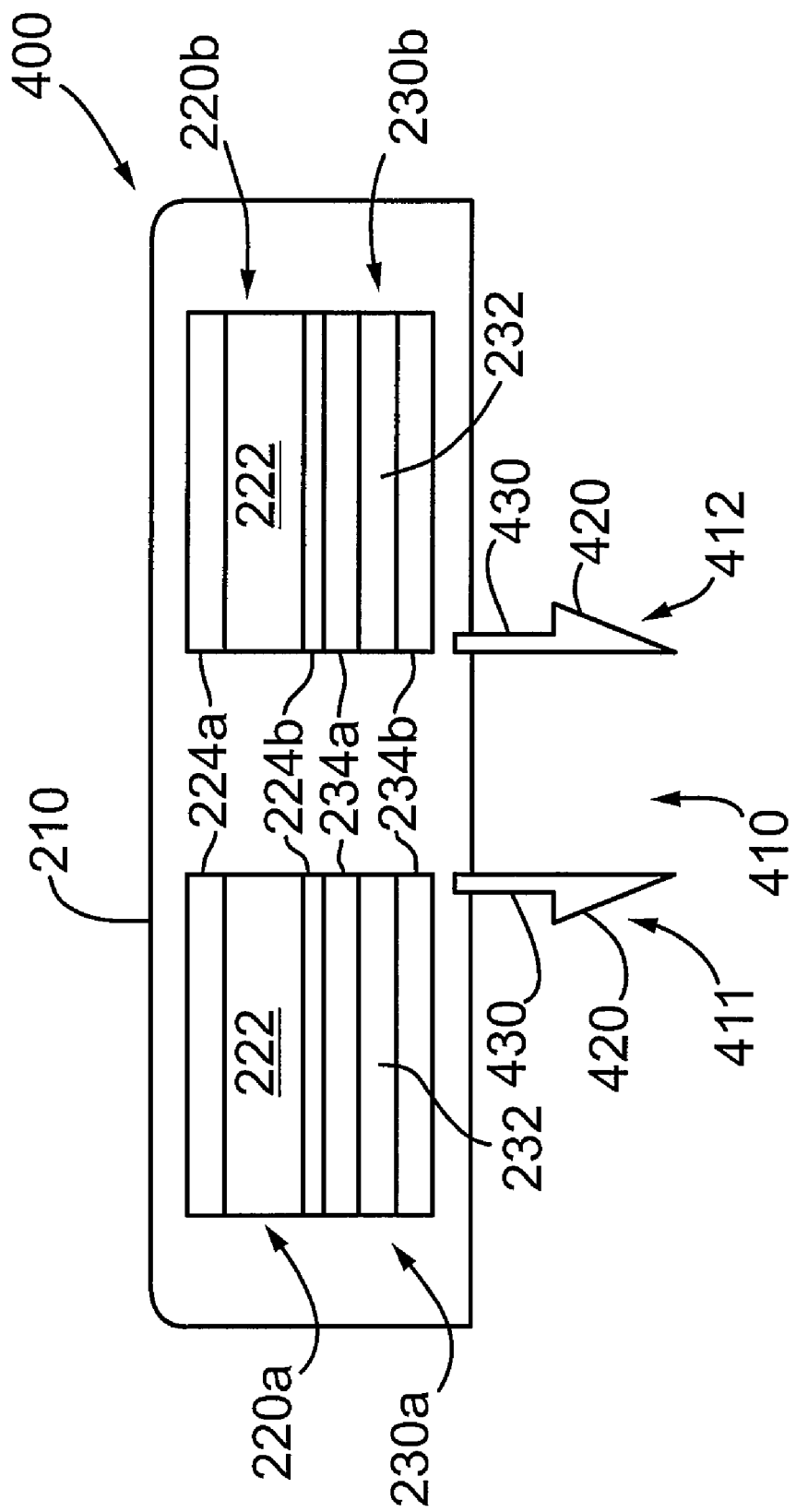
FIG. 4(a) shows a side view of a pipe support assembly with a bottom bracket for mounting the pipe support assembly according to an embodiment of the present invention.
Figure 4B:
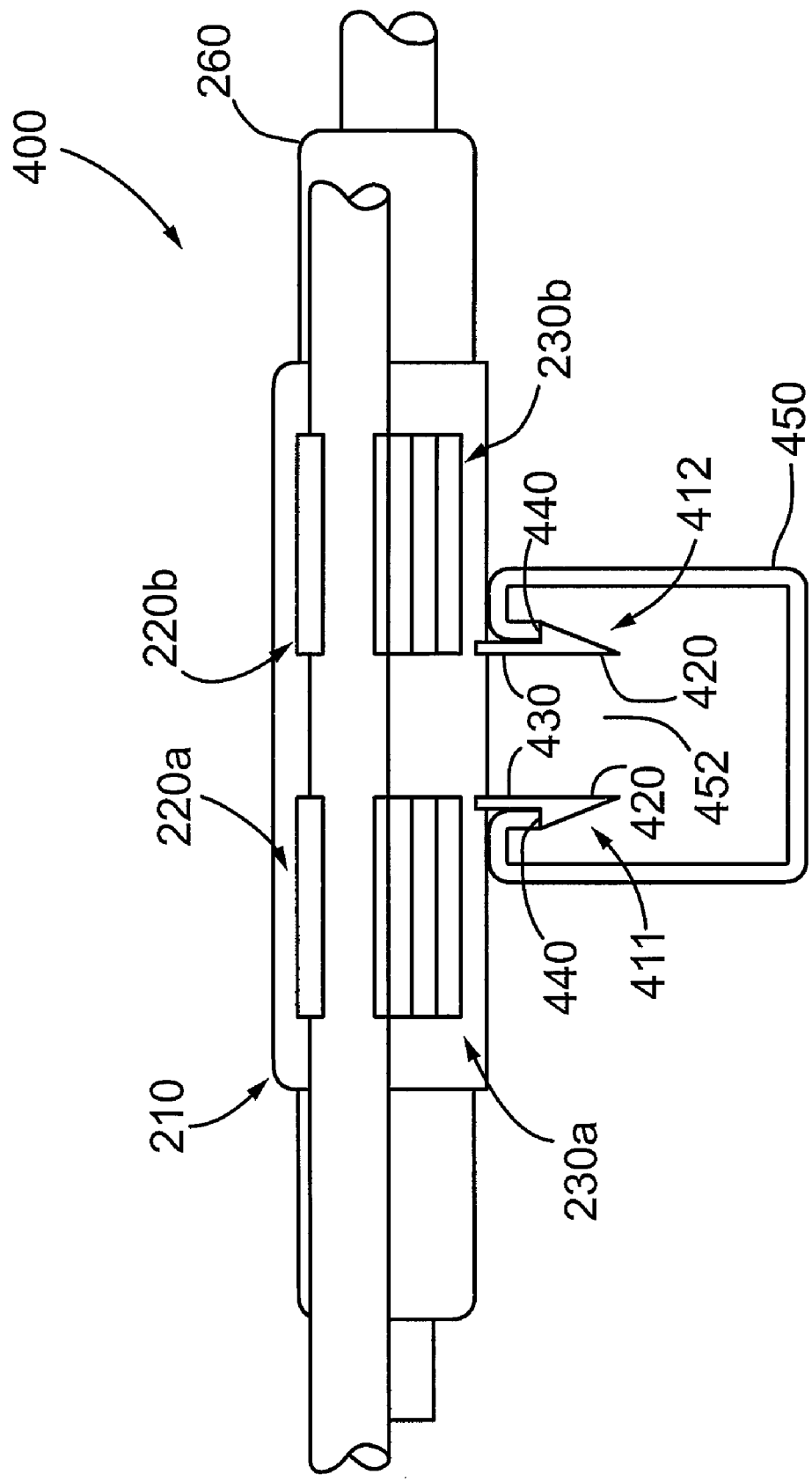
FIG. 4(b) shows a side view of the pipe support assembly of FIG. 4(a) mounted on an exemplary support structure.

Reference is next made to FIGS. 4(a) and 4(b), which show a pipe support assembly according to another embodiment of the invention. The pipe support assembly is indicated generally by reference 400 and comprises a mounting bracket (i.e. a bottom mounting bracket) indicated generally by reference 410. The mounting bracket 410 allows the pipe support assembly 400 to be secured from below as described in more detail with reference to FIG. 4(b). The pipe support assembly 400 corresponds generally to the pipe support assembly 200 described above with reference to FIGS. 2(a)-2(d), and comprises a first pipe holder or saddle 210, a second pipe holder 220, and a third pipe holder 230. The mounting bracket 410 replaces the ribs 240 and 242 (FIG. 2(b)) and the dimple 244 (FIG. 2(b)).

According to an embodiment, the mounting bracket 410 comprises a first engaging member 411 and a second engaging member 412. According to an embodiment, each of the engaging members 411 and 412 comprise a prong and include a locking end 420 and a shaft 430, as shown in FIG. 4(a). According to an embodiment, the shaft 430 comprises a semi-flexible material and is deflectable to allow the locking ends 420 to engage a flange or locking surface 440 in an opening 452 on a channel member or beam 450 as shown in FIG. 4(b). According to another embodiment, the shaft 430 and locking end 420 of the engaging members 411, 412 are extended laterally (i.e. width) to provide a stronger structure and wider surface for engaging the locking surface 440 in the beam 450. For a typical installation, the pipe support assembly 400 is attached to the beam 450 by pressing the mounting bracket 410 into the opening 452 on the channel member 450 and engaging the locking ends 420 with the flange 440. It will be appreciated that the configuration shown in FIGS. 4(a) and 4(b) provide the capability to securely mount one or more pipes above or on a structure fitted with the channel member 450 or another structural component with a similar channel configuration for engaging the mounting bracket 410.

Figure 5:
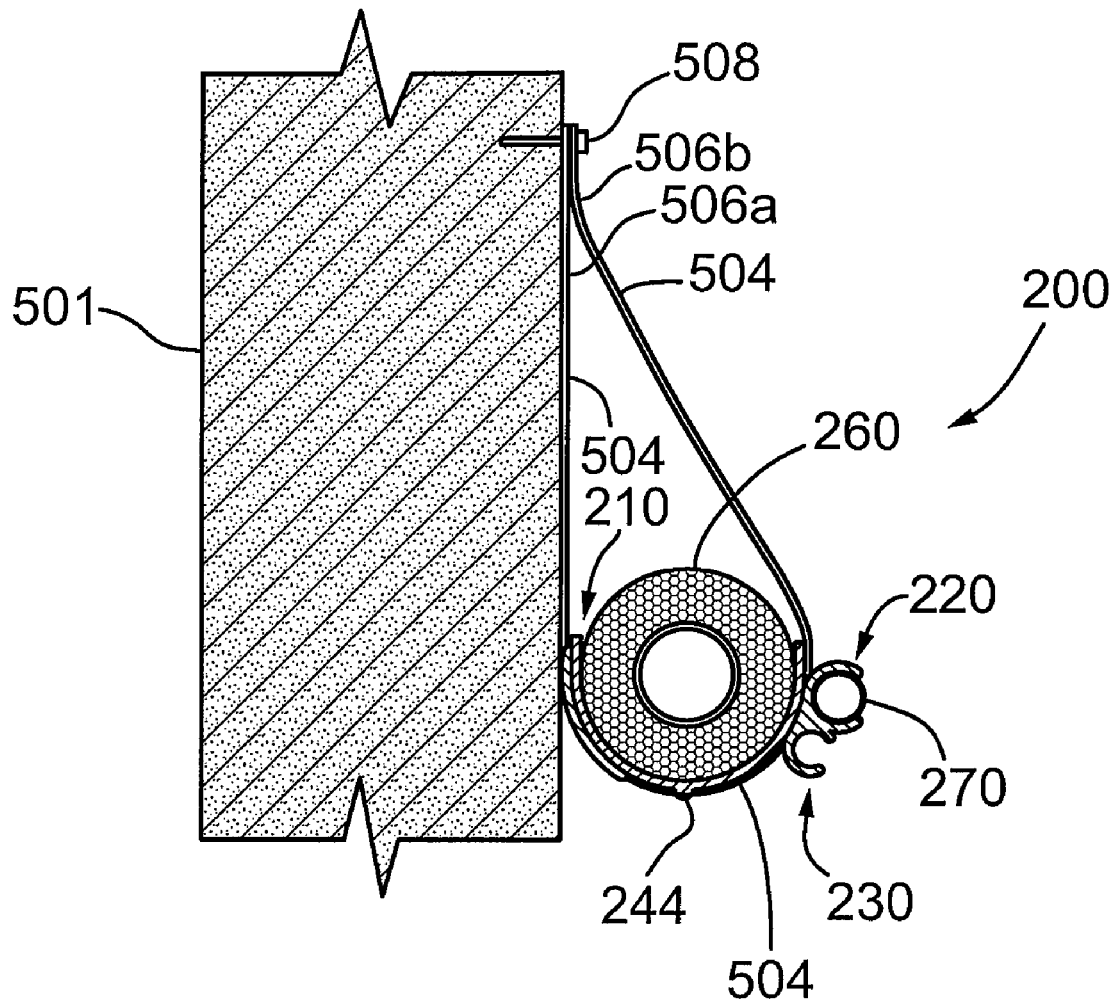
FIG. 5 shows a cross-sectional view of a pipe support assembly according to an embodiment of the present invention secured to a vertical mounting surface.

Reference is next made to FIG. 5, which shows an exemplary installation of piping against a vertical surface 501 utilizing the pipe support assembly 200 according to the present invention. As shown, the pipe support assembly 200 is fitted with an insulated pipe 260 and a second pipe 270 (e.g. an uninsulated pipe) in a manner as described above. The vertical surface 501 may comprise a wall or other structural element, for example, a beam. The pipe support assembly 200 is affixed or attached to the vertical surface 501 using a perforated strap indicated by reference 504. The perforated strap 504 is wrapped around the pipe support assembly 200 and positioned in place with the dimple 244, in a manner as described above. The two ends 506a and 506b of the strap 504 are then secured to the vertical surface 501 using a fastener 508, for example, a bolt, a nail, rivet or other suitable fastener.

Reference is next made to FIG. 6, which shows a pipe support assembly according to another embodiment of the present invention. The pipe support assembly is indicated generally by reference 600 and comprises a mounting base indicated by reference 610. The mounting base 610 allows the pipe support assembly 600 to be secured from below on a structural element such as a beam, a floor joist, or a wooden block or element, which is indicated by reference 640. The pipe support assembly 600 corresponds generally to the pipe support assemblies 200 and 400 described above with reference to FIGS. 2(a) and 4(a), respectively, and comprises a first pipe holder or saddle 210 that includes an interior surface 212, a second pipe holder 220, and a third pipe holder 230.

As shown, the mounting base 610 comprises a contact surface 612 which is generally flat for contacting with the structure 640. The pipe support assembly 600 is secured to the structure 640 using a fastener 608, for example, a bolt, a nail, a screw, or another suitable fastener. As described above, the pipe support assembly of the present invention may comprise a semi-flexible material such as injection molded plastic which is easily pierced by the fastener 608. In another embodiment, the pipe support assembly 600 is pre-fabricated with a hole or opening of a standard size corresponding to the diameter or size of the fastener 608. The hole or opening is directed through the interior surface 212 of the saddle 210 and through the mounting base 610 to facilitate securing the pipe support assembly 600 to the structure 640 with a fastener 608 during installation.

Reference is next made to FIG. 7(a), which shows a pipe support assembly according to another embodiment of the present invention. The pipe support assembly is indicated generally by reference 700 and comprises a saddle 710 and a pipe holder component 720. The saddle 710 is configured to hold or support a pipe as discussed above (i.e. a first pipe), and as shown in FIG. 7(a), includes a groove or channel 712. According to an embodiment, the pipe holder component 720 includes a first pipe holder 730 and a second pipe 740, which may be assembled or manufactured as a single component. The pipe holders 730, 740 are configured to function, i.e. hold or support a pipe or pipes, as described above. According to an embodiment and as shown, the pipe holder component 720 includes a connector or coupling member 722 which is configured to fit the groove or channel 712. According to an embodiment, the channel 712 comprises a dove-tail shaped channel and the coupling member 722 comprises a corresponding dove-tail shaped pin. According to an aspect, the saddle 710 and the pipe holder component 720 are attachable and detachable from each other at any time. For example, the pipe holder 720 and the saddle 710 may be purchased as separate components and installed by a technician in the field.

According to one aspect, this configuration allows a technician to select and mix and match from a variety of saddles and pipe holders depending on the size of the pipes necessary for a particular HVAC/R installation. To assemble the saddle 710 to the pipe holder 720, a technician places the connector (e.g. dovetail shaped pin) 722 of the pipe holder 720 into one end of the groove (e.g. dovetail channel) 712 of the saddle 710, and slides the pipe holder 720 and the saddle 710 together along the respective longitudinal axis until the pipe holder 720 and the saddle 710 are in the desired position. A locking device (not shown) may also be included to prevent the saddle 710 and the pipe holder 720 from disengaging or sliding relative to each other.

Reference is next to FIG. 7(*b*), which shows the pipe support assembly 700 in an assembled state or configuration, i.e. the saddle 710 and the pipe holder 720 that have been attached to each other. The connector 722 of the pipe holder 720 has been coupled, e.g. inserted, into the groove 712 of the saddle 710 which allows the pipe support assembly 700 to operate as a single component. According to another aspect, the pipe holder 720 can be detached from the saddle 710 by sliding the pipe holder 720 relative to the saddle 270 until the connector 722 of the pipe holder 720 is no longer inserted into the groove 712 of the saddle 710.

While the embodiment of the pipe support assembly shown in FIGS. 7(*a*) and 7(*b*) utilizes a groove-connector interface, it will be appreciated that the saddle 210 and the pipe holder 740 can be connected in any number of ways, for example, by using clips, nails, screws, bolts, and/or adhesives or by using a groove-connector interface of a different shape.

In summary, the pipe support assembly according to embodiments of the present invention provides a device or mechanism to support one or more pipes, for example, an insulated pipe and an uninsulated pipe or tube, on or against a structural member, and comprises a support mechanism which is configured to cradle the insulated pipe and minimize deformation of the insulation layer.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A pipe support assembly for supporting one or more pipes from a structure, the pipe support assembly comprising:
   a main member having a saddle for holding a first pipe, the main member including a guide for positioning a support strap for affixing to the structure; and
   a pipe holder attached to the main member and configured for holding a second pipe;
   wherein the guide comprises:
      a dimple for engaging an aperture in the support strap so as to prevent movement of the support strap; and
      one or more ribs adjacent opposite sides of the dimple so as to prevent lateral movement of the support strap.

2. The pipe support assembly as claimed in claim 1, wherein the pipe support assembly is formed from a unitary material.

3. The pipe support assembly as claimed in claim 2, wherein said saddle is configured with one or more edges for engaging the first pipe.

4. The pipe support assembly as claimed in claim 1, wherein the main member and the pipe holder are detachable from each other.

5. The pipe support assembly as claimed in claim 1, wherein said pipe holder includes deflectable edges for releasably engaging the second pipe.

6. The pipe support assembly as claimed in claim 5, wherein said first pipe comprises an insulated pipe having an outer insulation layer and an interior tube.

7. The pipe support assembly as claimed in claim 1, wherein the second pipe comprises an uninsulated pipe.

* * * * *